United States Patent [19]

Dagdeviren

[11] Patent Number: 5,406,583
[45] Date of Patent: Apr. 11, 1995

[54] MODEM WITH RECEIVED SIGNALS AND TRASMITTED SIGNALS COMPRISING SIGNAL SETS

[75] Inventor: Nuri R. Dagdeviren, Red Bank, N.J.

[73] Assignee: AT&T Corp., Murray Hill, N.Y.

[21] Appl. No.: 80,161

[22] Filed: Jun. 21, 1993

[51] Int. Cl.$^6$ .................. H04L 27/00; H04L 5/16
[52] U.S. Cl. ............................ 375/5; 375/8; 375/122
[58] Field of Search ................ 375/5, 8, 122; 370/32.1; 379/406, 93; 341/138

[56] References Cited

U.S. PATENT DOCUMENTS

| | | | |
|---|---|---|---|
| 4,459,655 | 7/1984 | Willemin | 364/132 |
| 4,538,262 | 8/1985 | Sinniger et al. | 370/85.1 |
| 4,706,194 | 10/1987 | Webb | 364/424.05 |
| 4,847,832 | 7/1989 | Chang | 370/85.1 |
| 4,942,571 | 7/1990 | Moller et al. | 370/85.1 |
| 4,988,989 | 1/1991 | Goto | 340/825.21 |
| 5,081,586 | 1/1992 | Barthel et al. | 364/424.05 |

OTHER PUBLICATIONS

"Digital Telephony", second edition, John Bellamy, pp. 38-41, 1991.

*Primary Examiner*—Stephen Chin
*Assistant Examiner*—Tesfaldet Bocure
*Attorney, Agent, or Firm*—Henry T. Brendzel

[57] ABSTRACT

An approach for operating modems in synchronism with the A/D and D/A converters of the network limits the analog signals transmitted to the modem to low levels and concurrently restricts the received signals to large steps. This set of apparently conflicting signal limitations is achieved with a signal conversion process interposed in the communication path between the two hybrids. In one embodiment of this invention, the code conversion is implemented in an adjunct processor that is associated with a switch that participates in the communication path between the two modems. In operation, a call that needs the conversion process is identified by virtue of the calling party's number and service associated service provision information. When it is established that both the calling party's modem and the receiving party's modem operate in the manner that requires signal conversion, conversion is executed. Echo cancellation may be applied to the signal in the code conversion apparatus to further improve performance.

11 Claims, 4 Drawing Sheets

FIG. 1

| n | $a_n$ | n | $a_n$ | n | $a_n$ | n | $a_n$ | n | $a_n$ |
|---|---|---|---|---|---|---|---|---|---|
| 0 | 0.00 | 26 | 36.50 | 52 | 147.50 | 78 | 471.50 | 104 | 1551.50 |
| 1 | 1.00 | 27 | 38.50 | 53 | 155.50 | 79 | 487.50 | 105 | 1615.50 |
| 2 | 2.00 | 28 | 40.50 | 54 | 163.50 | 80 | 511.50 | 106 | 1679.50 |
| 3 | 3.00 | 29 | 42.50 | 55 | 171.50 | 81 | 543.50 | 107 | 1743.50 |
| 4 | 4.00 | 30 | 44.50 | 56 | 179.50 | 82 | 575.50 | 108 | 1807.50 |
| 5 | 5.00 | 31 | 46.50 | 57 | 187.50 | 83 | 607.50 | 109 | 1871.50 |
| 6 | 6.00 | 32 | 49.50 | 58 | 195.50 | 84 | 639.50 | 110 | 1935.50 |
| 7 | 7.00 | 33 | 53.50 | 59 | 203.50 | 85 | 671.50 | 111 | 1999.50 |
| 8 | 8.00 | 34 | 57.50 | 60 | 211.50 | 86 | 703.50 | 112 | 2095.50 |
| 9 | 9.00 | 35 | 61.50 | 61 | 219.50 | 87 | 735.50 | 113 | 2223.50 |
| 10 | 10.00 | 36 | 65.50 | 62 | 227.50 | 88 | 767.50 | 114 | 2351.50 |
| 11 | 11.00 | 37 | 69.50 | 63 | 235.50 | 89 | 799.50 | 115 | 2479.50 |
| 12 | 12.00 | 38 | 73.50 | 64 | 247.50 | 90 | 831.50 | 116 | 2607.50 |
| 13 | 13.00 | 39 | 77.50 | 65 | 263.50 | 91 | 863.50 | 117 | 2735.50 |
| 14 | 14.00 | 40 | 81.50 | 66 | 279.50 | 92 | 895.50 | 118 | 2863.50 |
| 15 | 15.00 | 41 | 85.50 | 67 | 295.50 | 93 | 927.50 | 119 | 2991.50 |
| 16 | 16.50 | 42 | 89.50 | 68 | 311.50 | 94 | 959.50 | 120 | 3119.50 |
| 17 | 18.50 | 43 | 93.50 | 69 | 327.50 | 95 | 991.50 | 121 | 3247.50 |
| 18 | 20.50 | 44 | 97.50 | 70 | 343.50 | 96 | 1039.50 | 122 | 3375.50 |
| 19 | 22.50 | 45 | 101.50 | 71 | 359.50 | 97 | 1103.50 | 123 | 3503.50 |
| 20 | 24.50 | 46 | 105.50 | 72 | 375.50 | 98 | 1167.50 | 124 | 3631.50 |
| 21 | 26.50 | 47 | 109.50 | 73 | 391.50 | 99 | 1231.50 | 125 | 3759.50 |
| 22 | 28.50 | 48 | 115.50 | 74 | 407.50 | 100 | 1295.50 | 126 | 3887.50 |
| 23 | 30.50 | 49 | 123.50 | 75 | 423.50 | 101 | 1359.50 | 127 | 4015.50 |
| 24 | 32.50 | 50 | 131.50 | 76 | 439.50 | 102 | 1423.50 | | |
| 25 | 34.50 | 51 | 139.50 | 77 | 455.50 | 103 | 1487.50 | | |

MODEM WITH RECEIVED SIGNALS AND TRASMITTED SIGNALS COMPRISING SIGNAL SETS

BACKGROUND OF THE INVENTION

This invention relates to high speed modems.

In a co-pending application entitled "A High Speed Modem Synchronized To A Remote Codec" Ser. No. 07/963539, filed Oct. 20, 1992 and assigned to the assignee hereof, an invention was described for employing modems that are synchronized to the A/D and D/A converter clocks of the digital network over which signals are communicated. Specifically, a modem was described which is synchronized both in time and in quantization levels to the A/D converters in the network and which also takes into account the compressions introduced in the telephone network.

The synchronizing of such modems to the telephone network permits one to greatly reduce the noise that is introduced into the signals and also allows user modems to operate at the network's clock ram. In the T1 carrier system, for example, a 64 kb/s rate can theoretically be achieved.

Current local exchange carrier (LEC) switches need to provide "plain old telephone service" (POTS) to customers, which is analog service, and also need to provide digital signals to the inter-exchange carders, such as AT&T. In order to satisfy customer needs and inter-exchange carder requirements, LEC switches include a hybrid that divides the POTS two-wire bidirectional signal into a four-wire pair of unidirectional signals. In addition, an A/D converter and a D/A converter is included on the network side (i.e., the four-wire side) of the hybrid.

One characteristic of the improved modem disclosed in the above-referenced patent application is that the signal generated by the modem takes into account the $\mu$-law compression and expansion that exists in the telephone network. What that means is that the step sizes between adjacent digital signals vary exponentially.

This large variation in step sizes (e.g., by a factor of 128) presents a problem when the hybrids that are included in the LEC switches are imperfect. Imperfect hybrids allow a "leak-through" from the received signal to the transmitted signal and that, of course, is tantamount to noise.

In some equipment, the prevention of leak-through is no better than 6 db (power). What that means is that a digital signal of level 126, for example, will create an analog signal of level 3,888 units (via the $\mu$-law expansion) and that analog signal level, arriving at one analog port of the hybrid, will induce a 1,944 unit analog signal in the other analog port of the hybrid. The induced analog signal adds to the true analog signal of the port, and the challenge is to separate the induced signal from the true signal. Clearly, a modem that suffers a leak-through of this magnitude will have great difficulty in dealing correctly with many of the digital levels of the corrupted signal (e.g., a digital signal of level 100 results in an analog signal of 1,300 units compared to the undesired 1,944 unit leak-through, and all other digital signals lower than level 100 result in lower analog signals).

It is recognized that the telephone network contains two hybrids in an established interconnection: a near-end hybrid between a first modem (the near-end modem) and the network, and a far-end hybrid between the network and a second modem (the far-end modem). Each modem must deal, therefore, with a near-end echo (from the modem closest to it) and a far-end echo. With respect to the near-end echo, the interference suffered by the first modem in its reception of signals is due to its own transmitted signal leaking through the near-end hybrid into the received signal. Since this path is completely analog, the echo cancelling circuitry within the modem can effectively account for and discount the leak-through. Hence, the leak-through from the near-end hybrid does not present a problem. The leak-through from the far-end hybrid (the hybrid in the LEG switch connected to the far-end modem), on the other hand, does present a problem because of the quantization and the $\mu$-law compression expansion that is encountered by the signal in its path. The path includes the near-end modem, the near-end hybrid, the telephone network, leakage at the far-end hybrid, the network again and the near-end hybrid again. Because of the non-linearities in this path, the echo cancelling circuitry in the near-end modem cannot effectively cancel the transmitted signal echo.

For instance, when a digital word corresponding to the number 126 needs to be transmitted by the first, near end, modem, the analog signal that is sent by the modem is 3,888 units ($\mu$-law expansion). With only 6 db attenuation in the leak-through path, this signal creates a far-end echo of analog magnitude 1,944 units. If at the time corresponding to this echo the remote modem is attempting to send digital words corresponding to the number 2, which maps to an analog level 2 units, the composite signal of analog level 1,946 units is quantized to digital level 110 and sent to the near-end modem. At the near-end LEG switch, this digital level is converted to analog level 1,944, resulting in a failure on the part of the modem to detect the digital level 2 signal that was sent by the remote modem.

SUMMARY OF THE INVENTION

The above-described difficulties associated with using a modem in synchronism with the A/D and D/A converters of the network are solved, and an advance is achieved, by limiting the analog signals transmitted to the modem to low levels and by, concurrently, restricting the signals delivered by the modem to large steps. This set of apparently conflicting signal limitations is achieved with a signal conversion process interposed in the communication path between the two hybrids.

In one embodiment of this invention, this code conversion is implemented in an adjunct processor that is associated with a switch that participates in the communication path between the two modems. In operation, a call that needs the conversion process is identified by virtue of the calling party's number and service associated service provision information. When it is established that both the calling party's modem and the receiving party's modem operate in the manner that requires signal conversion, conversion is executed. Echo cancellation may be applied to the signal in the code conversion apparatus to further improve performance.

BRIEF DESCRIPTION OF THE DRAWING

FIG. 1 presents a table of the $\mu$-Law levels;

DETAILED DESCRIPTION

FIG. 1 presents a table that specifies the analog levels which correspond to digital words that represents numbers, in accordance with the standard $\mu$-255 coding law. Normalization is chosen in FIG. 1 such that digital level (n) 1 corresponds to analog level ($a_n$) of 1 unit. The numbers in this table are used in the illustrative embodiments below.

Figure 2:
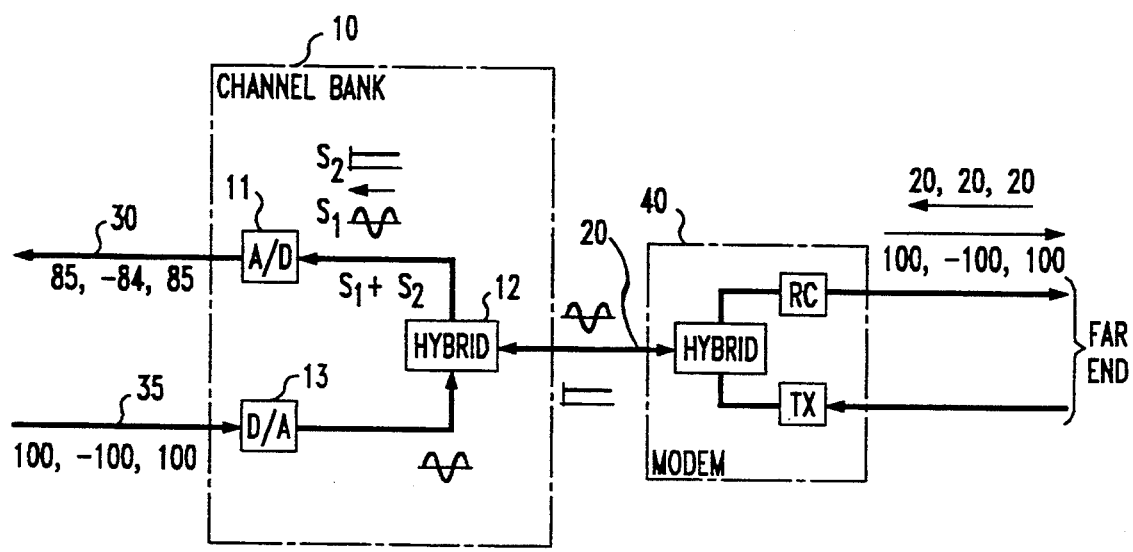
FIG. 2 is a block diagram depicting a far-end modem coupled to a channel bank, and the effect of the $\mu$-Law non-linearities on leak-through signals.

FIG. 2 presents a generalized block diagram of the A/D and D/A circuits and the hybrid found in the far-end LEC switch. In particular, FIG. 2 depicts a portion of a channel bank in block 10, and block 10 includes A/D converter 11 that is responsive to signals arriving from hybrid 12. Hybrid 12 receives signals from bidirectional line 20 and from D/A converter 13. A/D converter 11 outputs digital signals onto line 30. Digital signals arriving on line 35 are applied to D/A converter 13. Signals developed by D/A converter 13 and applied to hybrid 12 are aimed to be delivered on line 20 to modem 40. Modem 40 is the far-end modem. The near-end modem whose proper operation is under consideration is not shown in FIG. 2. It may be noted, in passing, that the $\mu$-Law conversions are performed in blocks 11 and 13. That is, the non-linearity associated with $\mu$-Law coding is incorporated in the circuitry that converts analog signals to digital signals, and vice-versa.

FIG. 2 aims to illustrate the problems associated with leak-through in hybrid 12 and the resultant effects of the D/A and A/D conversions in elements 13 and 11. For illustrative purposes, FIG. 2 presents a sequence of digital signals that corresponds to digital levels 100, −100, 100. At the output of D/A converter 13, an analog voltage is created that swings between a large positive value and a large negative value (e.g., between 1300 units and −1300 units). Hybrid 12 delivers this analog signal to modem 40, and modem 40 converts the analog signal to the digital sequence 100, −100, 100. Alas, hybrid 12 also delivers a leaked-through portion of this analog signal to A/D converter 11. If hybrid 12 provides only a 6 db echo return loss, then the echo signal applied to A/D converter 11 swings between 650 and −650 units. If modem 40 happens to be sending a digital signal 20, 20, 20 at that time, the corresponding analog signal applied by modem 40 to hybrid 12 is a dc level of 24.5 units. When that dc level is added to the reflected signal, the input to A/D converter 11 swings between +674.5 and −625.5 units. The A/D converter would then transmit the digital signals 85, −84, 85. Obviously, that is not the desired sequence of 20, 20, 20.

Moreover, even if it were known that the transmitted signal corresponds to the sequence 100, −100, 100, and even if it were known that the far-end hybrid reflects half of the signal, it would still be impossible to reconstruct the sequence 20, 20, 20 from the sequence 85; −84, 85.

If the primary leak-through problem were at the near-end hybrid, then one would wish to limit the transmitted signal in order to reduce the leak through signal that is created. One would also wish to increase the step sizes of the received signals in order to improve the confidence in the detection process.

Surprisingly, this disclosure suggests doing the exact opposite.

The concern in the embodiment of this invention is primarily directed to the leak-through problem in the far-end hybrid. As a result, it has been discovered that a good solution to the leak-through problem calls for the received signal in the far-end hybrid to be small in order to reduce the leak-through at the far-end, and for the signals applied to the distant hybrid for transmission to the network to have large step sizes so that whatever portion for the received signal does leak-through, the resultant output signal of the hybrid is not corrupted beyond repair.

The above-disclosed approach has three salient features that ought to be addressed: dynamic range limitations, code conversion, and near-end leak-through cancellation.

Dynamic Range Limitations

As disclosed above, in order to eliminate effects of leak-through on the far-end, one needs to limit the received signal to a small maximum value. Concurrently, one must insist on the different signals that may be applied to the hybrid for transmission to the network to be separated from each other by large steps. The combination of these two requirements clearly limits the user's freedom in using all signal magnitudes in the two communication directions. Stated in other words, the two requirements reduce the channel capacity. That reduction is dependent on the hybrid's performance capabilities, and on the signal processing techniques that are otherwise employed.

Thus, for a given level of signal leak-through, it seems clear, at least on first blush, that the leakage from the maximum received level should be no larger than half of the smallest step in the set of transmitted steps. For example, the signals that are selected for the transmitted signal set (from the table of FIG. 1) may be {0,49.5, 97.5, 147.5, 195.5, 247.5, 295.5,343.5, 391.5,439.5, 487.5, 543.5, 607.5, 671.5,735.5, 799.5, 863.5}, and the smallest step size in this set is 48.0, between signals 147.5 and 195.5, for example. The leak-through from a received signal should be less than half of 48.0, or 24.0, so that the transmitted signal is not adulterated beyond capacity to identify the true transmitted signal. If the leak-through from the received signal is not to exceed 24.0, then at 40% leak-through, the maximum received signal should not exceed 60.0. If S, the largest received signals, is thus limited to 60.0, the number of levels that a received signal can contain (within the $\mu$-law constraints of the sparser table in FIG. 1) is 2 times 34 plus 1, or 69, accounting for positive and negative values of non-zero signals FIG. 3 pictorially illustrates the set of table entries (every other one) in column A, a possible set of transmitted signals in column B, and a corresponding set of received signals in column C. Modem 40, of course would have its receive circuitry adapted to receive and process signals having the dynamic range of the signals in column C and its transmit circuitry adapted to output signals having the dynamic range of the signals in column B.

In the above example, the number of possible different transmitted signals and the number of possible different received signals is about the same, but that need not be the case. One can purposely design a low speed channel and a high speed channel, and apportion the signal accordingly. The high speed channel may be the one that corresponds to column C in FIG. 3; i.e., the signal set that has a limit on its maximum signal, or it may be one that corresponds to column B in FIG. 3; i.e., the one that employs the full dynamic range to separate adjacent signals (in the set) as far apart as possible.

As indicated above, the limitation of the largest received signal to insure that the leak-through is not more than half the smallest step size if a 'first blush' limitation. It is a sufficient limitation, but not necessarily the tightest limitation. As is demonstrated below, use can be made of knowledge about the signal transmitted by the near end channel bank to affect the signal received at the near end channel bank, thereby ameliorating the effects of leak-through at the far end channel bank. One additional approach for loosening the severity of this requirement is the use of trellis coding techniques. This technique is, in effect, context coding. That is, the codes that are transmitted consecutively are not truly random and information about those codes may be used to correct errors. Given an error correction capability, it follows that a certain level of risk of error introductions at A/D converter 11 can be tolerated, and that suggests that the maximum level that can be accepted at hybrid 12 from D/A converter 13 may be increased, or the step sizes between different signals applied to hybrid 40 from modem 40 may be reduced. Of course, the transmit circuitry in modem 40 would be adapted to output signals with the dynamic range of the column B signals, and the receive circuitry of the modem would be adapted to accept signals with the dynamic range of the column C signals.

Code Conversion

Figure 3:
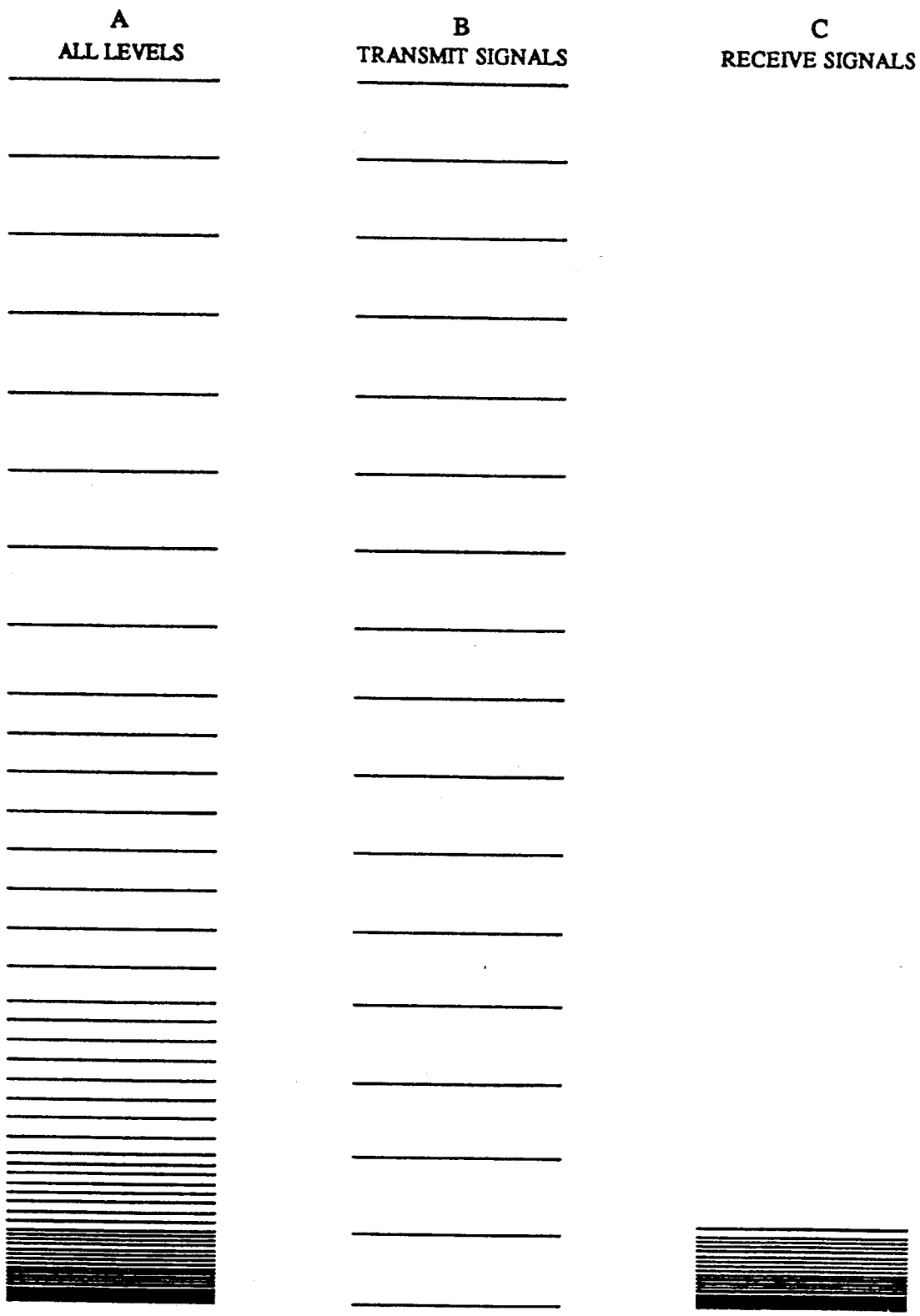
FIG. 3 depicts a possible set of signals to be used in communicating with the modem of FIG. 2.

Even a cursory look at the FIG. 3 signals reveals that the relationship between the transmitted signals and the received signals is not linear. In other words, one cannot depend merely on attenuation to convert the signals transmitted by one channel bank's A/D converter into signals received by another channel bank's D/A converter.

Figure 4:
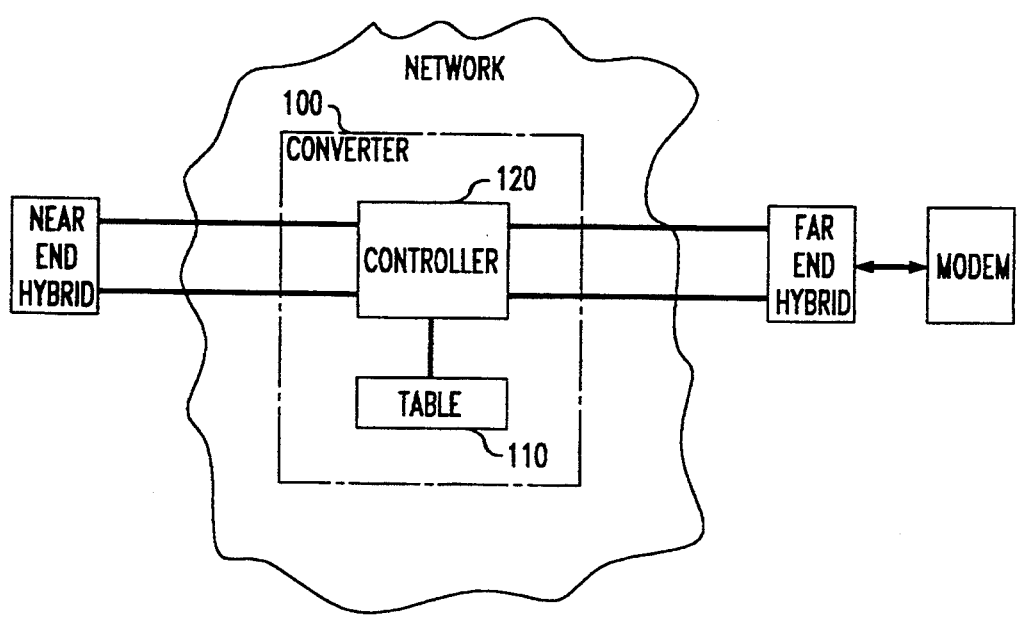
FIG. 4 shows one embodiment for effecting the code conversions necessary in connection with signals sets such as depicted in FIG. 3.

FIG. 4 presents one embodiment of a code converter that makes the necessary signal conversions. This converter (100), as depicted in FIG. 4, can be located anywhere along the digital signal path from one channel bank to the other. It need only include a simple mapping apparatus, such as a look-up table 110.

Of course, once converter 100 is included in the network, it can be imbued with additional capabilities. One such capability that will almost certainly be included by all practitioners is the ability to provide no mapping at all for one or both of the paths, and the ability to control the mapping based on the relative data rates in the two directions.

In connection with the provision of no mapping in both paths, this condition may be desirable when the modems at the two ends of the communication are not of the synchronized variety, or when the data rate is low enough in both directions to allow a small enough constellation of signals and hence large step sizes between signals. The decision to include or not include code conversion may be effected by controller 120 merely by identifying the caller ID and determining from a customer look-up table (not shown) that the caller subscribes to the code conversion service. Alternatively, controller 120 can analyze the call establishment protocol signals to achieve the same end results.

Mapping only in one direction may be desired when one of the channel banks is a "four wire" facility and contains no hybrids. That information may be supplied to controller 120 by the "four-wire" facility.

Negotiations on data rates typically take place between the communicating modems. In the system of FIG. 4, controller 120 in converter 100 participates in those negotiations (or at least listen in on those negotiations) and decides on the particular code conversion established for the given communication.

One convenient placement of converter 100 in the network is in association with a switch that participates in the connection between the two modems. That switch may be an inter-exchange carrier switch or a local exchange carrier switch. Alternatively, the code conversion may be effected in the receiving channel bank's hybrid either on the digital side or on the analog side.

Near-End Leak-Through Cancellation.

In the arrangement described above the signals applied by a modem to channel bank hybrid near it are large, and by design (i.e., through the work of converter 100) the signals arriving at the channel bank hybrid and destined to the modem are low. Since the hybrid at the near-end channel bank is, presumably, comparable than the hybrid at the far-end channel bank, (i.e., element 10 of FIG. 2) one may reasonably assume that the leak-through signal at the near-end channel bank is comparable to the leak-through at hybrid 10. However, the difference between the two hybrids is that the near-end leak-through does not go through a non-linear quantication process, as the far-end leak-through does. That is, a signal destined to modem 40 of FIG. 2 is leaked back to its source through the channel bank hybrid that is close to the source, but that leaked signal does not go through any quantizing operations. That signal is also leaked through element 10 and is returned to its source, but this leaked signal goes through A/D quantization in the hybrid close to the source, through D/A quantization in element 10, through A/D quantization in element 10, and lastly, through D/A quantization in the hybrid close to the signal source. Of course, the leak-through that does not suffer from quantization effects is the familiar classical near-en which can be compensated for within the modem in conventional echo cancellation circuitry (not shown).

Far-End Leak-Through Cancellation.

Although the far-end leak-through is non-linear, it is still possible to improve performance by attempting to compensate for the leak-through. This compensation can occur anywhere along the digital path, but one convenient placing for such compensation is in code converter 100.

Figure 5:
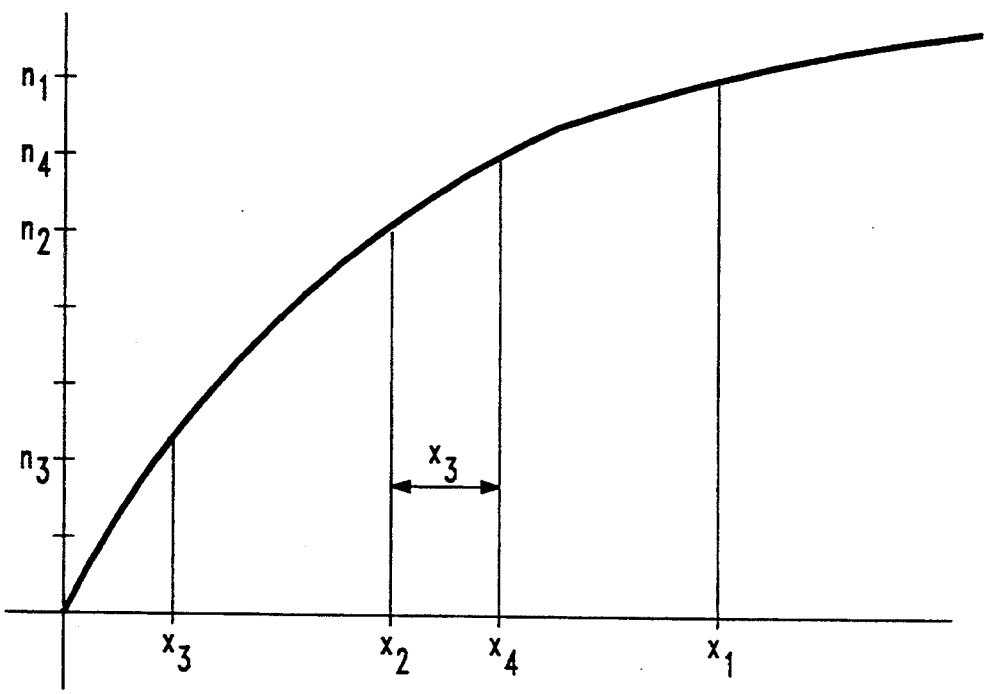
FIG. 5 demonstrates the non-linear distortion occurring at far-end modems.

FIG. 5 illustrates the non-linearity problem. Assuming an input to channel bank (e.g., element 13) of digital value $n_1$ (a signal from column C), which corresponds to analog level $x_1$, a leak-through signal of magnitude $x_2$ is created and is sent back to the network in the form of a digital signal of value $n_2$ (in the absence of a signal to be transmitted from the modem; e.g., modem 40). It may be noted that the signal $x_2$ in FIG. 5 is quantized in the process of converting to the value $n_2$. If a signal other than $n_2$ is being sent to the network, it is because of a signal that originates at the modem and is not part of the leak-through signal. Such a signal, for example a signal of magnitude $x_3$, would be added to the leak-through signal, resulting in a signal $x_2+x_3$, and converted to digital form to yield the value $n_4$. Absent the leak-through, the input signal $x_3$ should have developed the digital value $n_3$.

The object of compensating for the leak-through is to extract the information regarding transmitted signal $n_3$ which is hidden in the level $n_4$ by utilizing the information on the sequence of signals $n_1$ causing the leak-through and the characteristics of the leak-through channel.

In accordance with one embodiment disclosed herein, this object is realized by realizing that signal $n_1$ is known to produce the echo $n_2$. It is also known that signal $n_4$ corresponds to an analog signal in the neighborhood of signal $x_4$. Armed with this knowledge and given that signal $n_1$ is being sent, a table look-up can ascertain the value of $x_2$ as well as the value of $x_4$. Subtracting the two values yields an approximation to the signal $x_3$ and, based on the $\mu$-Law function, the value $n_3$ can be derived.

Figure 6:
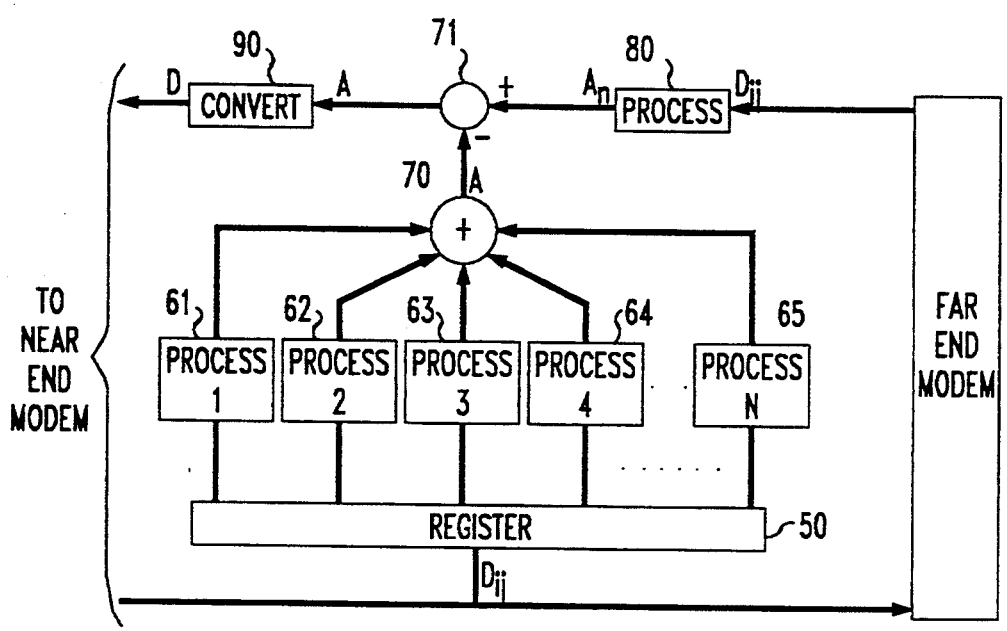
FIG. 6 presents one embodiment for compensating for at least some of the non-linear distortion.

A structure to implement this procedure is depicted in FIG. 6. Therein, the signal sent to the far-end modem $n_1$, is applied to tapped delay line register 50. The first tap, corresponding to the most recent value sent to the far-end modem is applied to processor 61. Similarly, the next to most recent value is processed in processor 62 with its corresponding tap. The outputs of processors 61 through 65, through adder 70, is applied to the negative input of subtractor 71. The signal transmitted by the far-end modem is applied to processor 80 and the output of processor 80 is applied to the positive input of subtractor 71. The output of subtractor 71 is applied to converter 90, whose output is sent to the near-end modem. Converter 90 converts the analog signal to digital signal and converts from the dynamic range of column B to the dynamic range of column C.

Processor 80 receives the digital value sent by the far-end modem (corresponding to level $n_4$ in FIG. 5 for example) and develops therefrom an analog level in accordance with the $\mu$-Law relationship specified in FIG. 1. It is anticipated that processor 80 will be merely a look-Up table (embodying the FIG. 1 relationships) followed by a D/A converter.

Processor 61 also employs the look-up table utilized by processor 80. Based on the digital input to the table, an analog value is derived, and thereafter a multiplicative factor is applied which corresponds to the first discrete time response leak-through of the channel developed in the far-end hybrid.

Thus, the output of processor 61 corresponds to one component, that is due to the most immediate coefficient of the discrete time impulse response of the leak-through channel, of the signal $x_2$ of FIG. 5, the output of processor 80 corresponds to the signal $x_4$ of FIG. 5, and the output of subtractor 71 corresponds to the signal $x_3$ of FIG. 5. The output of subtractor 71 is applied to converter 90, which also is the look-up table of FIG. 1 (although in a reversed sense). It converts the signal $x_3$ to the digital level $n_3$ and forwards that level to the near-end modem after performing code conversion as described earlier.

The reason for using a set of processors 61–65 instead of a single processor is, of course, that electronic systems have an impulse response that spans a period of time. In other words, an input applied to the far-end modem at time t will create echoes at time t, t+1, t+2, .... It is the function of register 50, processors 62, 63, ... and adder element 71 to compensate for these echoes. Processors 62, 63 ... work exactly the same as processor 61, with the exception that they are responsive to different taps of the tapped delay line register 50 and the multiplicative factor employed is different in each of the processors. Because influence of the echoes is cumulative, the analog output signals of processors 61, 62, 63 ... are added in element 70.

It should be appreciated that the discussion above makes reference to a multiplicity of tables (one in each of the processors) only for the sake of simplifying the discussion and clarifying the concepts. In a preferred embodiment, it is most likely that a single look-up table is time-shared.

The multiplicative factors employed in processors 61, 62, 63 ... are derived with the aid of a training session. A suitably chosen sequence is transmitted towards the far-end modem and, in parallel, this sequence is converted to a sequence of analog levels through the mapping in FIG. 1. This analog sequence is then processed through a tapped delay line. The output of the tapped delay line is quantized to generate digital levels through the mapping in FIG. 1. The coefficients of the tapped delay line are then adjusted until the output of the quantizer is observed to be the same as the received digital sequence from the far-end. The tapped delay coefficients obtained in this manner directly correspond to the multiplicative factors mentioned above.

As an aside, some existing systems employ digital loss insertion at the point immediately prior to the D/A connection. That means that each signal level is mapped from one digital level to another, lower, digital level. This mapping is not "1 to 1" and, therefore, this mapping leads to information loss. For example, with reference to FIG. 1, when digital insertion loss is employed and a digital input of 24 is applied, the corresponding analog signal of 32.50 is (for example) divided by 2 to yield 16.25 which corresponds to digital signal 16. Similarly, a digital input of 25 also converts to 16. This presents a problem when it is desired to uniquely identify the input (whether 24 or 25 was sent). The digital insertion loss is compensated for (in systems that include it) by pre-mapping the signal sent to the modem by an inverse mapping corresponding to the known digital loss mapping. Such compensation, or pre-mapping is implemented most directly and conveniently in processor 90.

In fact the advantages gained by this pre-mapping approach is not limited to modems synchronized to the network sampling clock. The elimination of the additional quantization noise introduced by digital loss insertion can be performed in this way, resulting in an improved signal to noise ratio, over the channel connecting any two modems. This in turn allows more densely populated constellations to be used by the modems, yielding a higher data rate.

The above-described embodiments disclose the principles of this invention, but it should be understood that the embodiments presented herein are merely illustrative. For example, a commercial system embodiment for converter 100 would take control over more than one line, operating in one direction, as depicted in FIG. 4. Also, various additions and modifications to the disclosed embodiments are possible that do not depart from the spirit and scope of the invention.

I claim:

1. Apparatus comprising:
   a first port for communicating digital signals and a second port for communicating bidirectional analog signals, and
   a modem coupled to the first port and the second port, including receive circuitry responsive to an analog signal received at the second port for converting said analog signal to a digital signal applied to said first port and for developing a maximum value N for said digital signal when said analog signal reaches a maximum analog level having a first magnitude, where N is an integer; and transmit circuitry for applying an analog signal corresponding to a digital signal received at said first port and applied to the transmit circuitry, where the analog signal applied by said transmit circuitry to the second port has level of a second magnitude, where said second magnitude is at least twice as large as the first magnitude, and where the maximum magnitude of the analog signal developed by the transmit circuitry is developed in response to a value of N of the digital signal applied to the transmit circuitry, thus the analog signal received by said receive circuitry is characterized by a small dynamic range compared to the analog signal developed by the transmit circuitry, and the analog signal developed by said transmit circuitry is characterized by a large dynamic range compared to the analog signal received by the receive circuitry.

2. The apparatus of claim 1 where the analog signal received at the second port and applied to the receive circuitry is an analog signal that results from a preselected compression algorithm.

3. The apparatus of claim 1 further comprising a converter responsive to signals developed by the transmit circuitry for converting applied signals having said large dynamic range into signals having said low dynamic range where the analog signal received at the second port comprises a first signal set and the analog sisal developed by the transmit circuitry comprises a second signal set.

4. The apparatus of claim 3 wherein the converter includes circuitry for communicating with the modem to determine whether conversion from the second signal set to the first signal set is necessary.

5. The apparatus of claim 1 further comprising:
a channel bank hybrid circuit having
   a) a bidirectional analog port coupled to said first port and to an analog hybrid circuit,
   b) an incoming digital port,
   c) a D/A converter interposed between the incoming digital port and the analog hybrid,
   d) an outgoing digital port, and
   e) an A/D converter interposed between the outgoing digital port and the analog hybrid, and
a converter for modifying dynamic range of signals, having a first converter input port, a first converter output port, a second converter input port and a second converter output port, and having
   a) the first converter input port connected to said outgoing digital port of the channel bank hybrid,
   b) the first converter output port connected to said incoming digital port of the channel bank hybrid,
   c) the second converter input port connected to an outgoing digital port of another channel bank hybrid circuit, and
   d) the second converter output port connected to an incoming digital port of said another channel bank hybrid circuit.

6. The apparatus of claim 5 wherein said converter comprises:
means for converting digital data arriving at said first converter input port to analog form, thereby forming a first intermediate signal,
means for converting digital data arriving at said second converter input port to analog form, thereby forming a second intermediate signal,
means for subtracting the second intermediate signal from the first intermediate signal to form a third intermediate signal, and
means for developing a digital representation of the third intermediate signal with a reduced dynamic range to form a converter output signal, and for applying the converter output signal to the second converter output port.

7. The apparatus of claim 6 wherein the means for converting digital data arriving at said second converter input port to analog form comprises:
a tapped delay means responsive to said digital data arriving at said second converter input port,
a plurality of data altering means, each connected to a different tap of said tapped delay means, for developing an analog signal that corresponds to the digital data applied to the data altering means multiplied by a factor between 0 and 1, including 1, and
an adder responsive to the analog signals developed by said plurality of data altering means to form said second intermediate signal.

8. A method for communicating a digital signal, comprising the steps of:
converting the digital signal to an analog signal having a first maximum analog level,
developing a digital signal responsive to said analog signals, where said digital signal corresponds to said analog signal but with an attenuated maximum level, achieving thereby a mapping from the digital signal applied to said step of converting to the digital signals created by said step of developing a digital signal to uniquely relate each value at the input to the step of converting with a unique output of the step of developing for assisting in cancelling an echo signal.

9. The method of claim 8 where the mapping is a 1 to 1 mapping.

10. The method of claim 8 further including a step of subtracting a separate analog signal from the analog signal developed by said step of converting, prior to applying said step of developing a digital signal.

11. The method of claim 8 further including the step of ascertaining the need to carry out the step of mapping.

* * * * *